US010724584B1

(12) United States Patent
Pausina

(10) Patent No.: US 10,724,584 B1
(45) Date of Patent: Jul. 28, 2020

(54) CLUTCH-RELEASE CONTROL FOR A MOTORCYCLE

(71) Applicant: Stanley C Pausina, Covington, LA (US)

(72) Inventor: Stanley C Pausina, Covington, LA (US)

(*) Notice: Subject to any disclaimer, the term of this patent is extended or adjusted under 35 U.S.C. 154(b) by 0 days.

(21) Appl. No.: 16/364,766

(22) Filed: Mar. 26, 2019

Related U.S. Application Data

(63) Continuation-in-part of application No. 15/674,641, filed on Aug. 11, 2017, now abandoned.

(60) Provisional application No. 62/373,414, filed on Aug. 11, 2016.

(51) Int. Cl.
| | |
|---|---|
| *F16D 43/28* | (2006.01) |
| *B62M 25/02* | (2006.01) |
| *F16D 125/64* | (2012.01) |
| *F16D 121/04* | (2012.01) |
| *F16D 125/06* | (2012.01) |

(52) U.S. Cl.
CPC ............. *F16D 43/28* (2013.01); *B62M 25/02* (2013.01); *F16D 2121/04* (2013.01); *F16D 2125/06* (2013.01); *F16D 2125/64* (2013.01)

(58) Field of Classification Search
CPC .... F26D 25/085; F26D 23/12; F26D 2125/06; Y10T 74/20558; Y10T 74/20396
See application file for complete search history.

(56) References Cited

U.S. PATENT DOCUMENTS

| | | | | |
|---|---|---|---|---|
| 3,430,512 | A * | 3/1969 | Wossner | F16D 25/088 |
| | | | | 74/512 |
| 4,924,992 | A * | 5/1990 | Romig | F16D 25/14 |
| | | | | 192/109 F |
| 7,051,852 | B2 | 5/2006 | Maret | |
| 8,727,081 | B2 | 5/2014 | Phipps | |
| 2004/0026208 | A1* | 2/2004 | Nix | F16D 25/14 |
| | | | | 192/109 F |
| 2010/0181158 | A1* | 7/2010 | Macht | F15B 21/008 |
| | | | | 192/85.01 |
| 2011/0303315 | A1* | 12/2011 | Gebert | F15B 21/008 |
| | | | | 138/30 |
| 2012/0186934 | A1* | 7/2012 | Ota | F16D 48/02 |
| | | | | 192/85.63 |
| 2014/0110217 | A1 | 4/2014 | Cichon, Jr. | |

FOREIGN PATENT DOCUMENTS

WO       WO 0208771       10/2002

* cited by examiner

*Primary Examiner* — Stacey A Fluhart
(74) *Attorney, Agent, or Firm* — Kenneth L Tolar

(57) ABSTRACT

A clutch-release control for a motorcycle includes a post having an aperture on a first end that telescopically receives a biased piston. The piston includes a cap at a distal end and a flange spaced therefrom. The piston is movable between a retracted position, where the cap is proximal the first end of the post, and an extended position, where the cap engages a clutch-release arm on a motorcycle. To use the device, a rider releases a latch to thrust the cap into engagement with the clutch-release arm. When the rider fully opens the throttle and releases the clutch, the piston applies a predetermined amount of resistance to the arm, preventing the clutch from suddenly engaging the motor.

20 Claims, 4 Drawing Sheets

CLUTCH-RELEASE CONTROL FOR A MOTORCYCLE

CROSS REFERENCE TO RELATED APPLICATIONS

This application is a continuation-in-part of application Ser. No. 15/674,641 filed on Aug. 11, 2017, which claimed the benefit of provisional patent application No. 62/373,414 filed on Aug. 11, 2016, the specifications of which are both incorporated herein by reference.

BACKGROUND OF THE INVENTION

The present invention relates to a device that allows a motorcycle rider to fully accelerate from a stationary position without causing the front end of the motorcycle to lift or the tires to slip on an underlying surface.

DESCRIPTION OF THE PRIOR ART

Because many motorcycle races are held on narrow, confined tracks where passing other riders is difficult, a quick start is often paramount to a victory. Therefore, most riders strive to get the "holeshot," or to be the first rider to leave the starting area, and reach the first turn or another landmark position along the route. When trying to secure an early lead at the outset of a race, typically the rider fully opens the throttle while quickly releasing the clutch. When the clutch is quickly released, a clutch-release arm pivots rapidly and the clutch suddenly engages an engine to apply rotational power to the rear wheel. The sudden engagement usually causes the front end of the motorcycle to lift and the tires to spin or slip on an underlying surface. In order to prevent the tires from lifting and slipping, a rider can attempt to inhibit the clutch-release speed by gradually releasing the control lever on the handlebar. However, such practice is cumbersome, annoying and usually ineffective.

A review of the prior art reveals a few devices that purportedly address the above-described problem. For example, U.S. patent publication no. 2014/0110217 to Cichon, Jr. discloses various clutch dampers, including an embodiment having a pneumatic piston extending from a cylinder that applies resistance to a clutch-release arm.

U.S. Pat. No. 7,051,852 issued to Maret discloses a device for initially compressing and locking a motorcycle's suspension fork to shift the center of gravity forward to minimize lifting. The locking mechanism is automatically released when a rider applies the brake at the first turn of a racetrack.

U.S. Pat. No. 8,727,081 issued to Phipps discloses a magnetic mechanism for compressing a suspension fork until manually released by a rider.

Although the prior art discloses a few devices that purportedly prevent the front end of a motorcycle from rising at acceleration, they employ hooks or latches that can damage fork guards or other components. Furthermore, the devices require manual manipulation of a button, a lever or the motorcycle's brakes in order to release the compression lock and return to normal operation. Although Cichon discloses a pneumatic piston extending from a cylinder that applies resistance to a clutch-release arm, the reference primarily relates to dampening a clutch on a motor vehicle operated by inexperienced or physically challenged drivers. And the device is not remotely concerned with allowing a motorcycle operator to achieve a holeshot then subsequently return to normal unimpeded clutch operation. Therefore, the device includes no means for securing the biased piston in its original, retracted position so the motorcycle can operate normally after an initial start.

Conversely, the present invention includes a piston that applies a limited, controlled amount of resistance to a clutch-release arm during an initial acceleration to prevent a clutch from suddenly engaging an engine. Once the clutch-release arm fully retracts the piston, a latching mechanism automatically locks it to allow the clutch to operate normally thereafter.

SUMMARY OF THE INVENTION

The present invention relates to a clutch-release control for a motorcycle including a post having an aperture on a first end that telescopically receives a biased piston. The piston includes a cap at a distal end and a flange spaced therefrom. The piston is movable between a retracted position, where the cap is proximal the first end of the post, and an extended position, where the cap engages a clutch-release arm on a motorcycle. To use the device, a rider releases a latch to thrust the cap into engagement with the clutch-release arm. When the rider fully opens the throttle and releases the clutch, the piston applies a predetermined amount of resistance to the arm, preventing the clutch from suddenly engaging the motor.

It is therefore an object of the present invention to provide a device that prevents a clutch-release arm from releasing too quickly while a throttle is fully opened.

It is another object of the present invention to provide a clutch-release control that enhances traction and stability when a motorcycle is quickly accelerating from a resting position.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
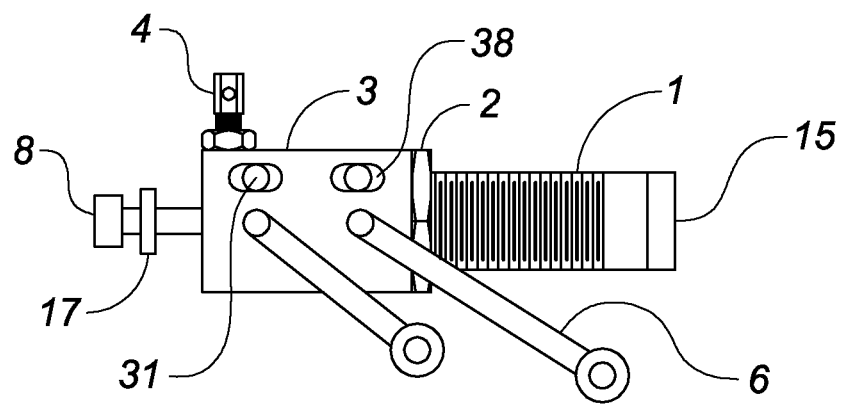
FIG. 1 is an isolated, plan view of the clutch-release control according to the present invention.

Now referring to FIG. 1-6, a first embodiment of the present invention relates to a clutch-release control for a motorcycle comprising a hollow sleeve 3 having an outer wall and two opposing open ends in communication with an interior chamber. Received within the interior chamber is a post 1 having a first end, a threaded intermediate portion passing through an internally threaded nut 2 and a second opposing end. A bracket 6 on the sleeve outer wall includes multiple fasteners 7 to properly secure the device to the motorcycle's engine case, near the clutch-release arm 5.

Figure 2:
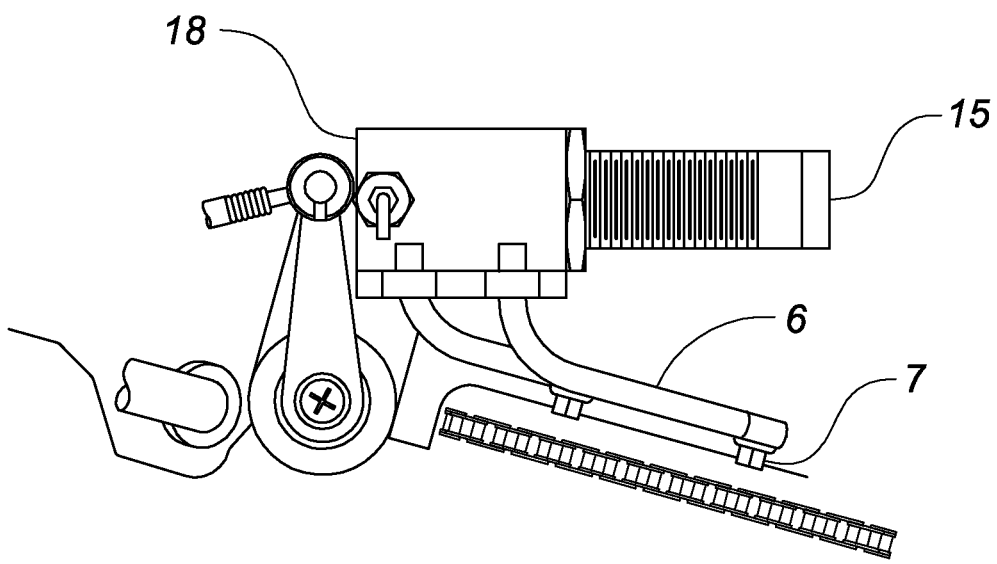
FIG. 2 depicts the clutch-release control of FIG. 1 installed adjacent to a clutch-release arm with the piston in a retracted position for normal clutch operation.
Figure 3:
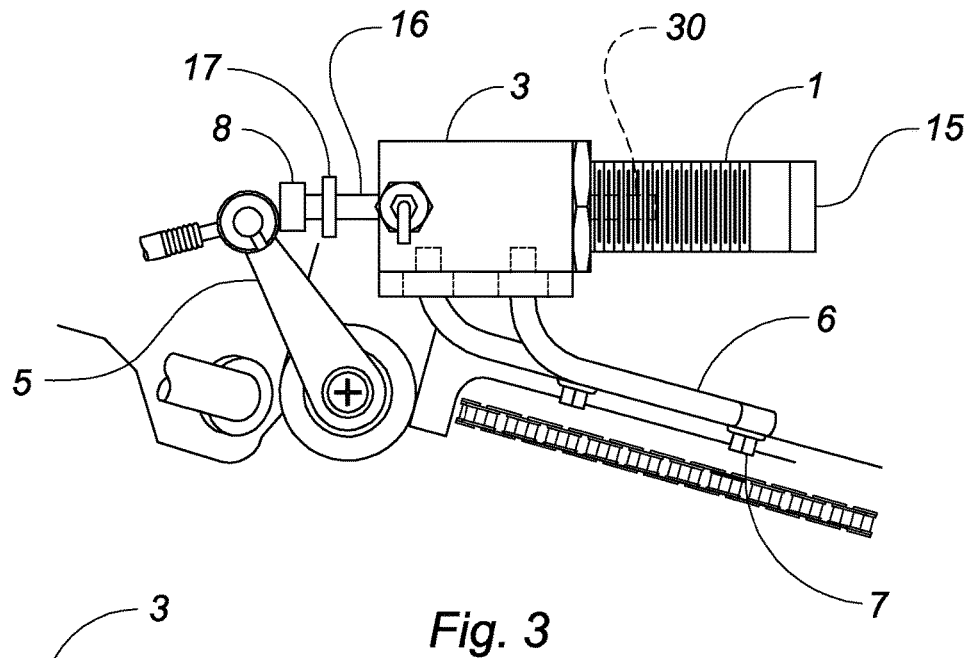
FIG. 3 depicts the clutch-release control of FIG. 2 with the piston in an extended position, and engaging the clutch-release arm prior to a quick acceleration.
Figure 4:
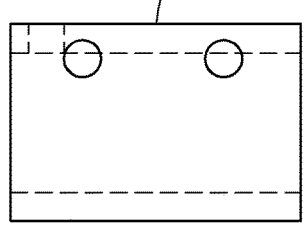
FIG. 4 is an isolated view of the sleeve.
Figure 5:
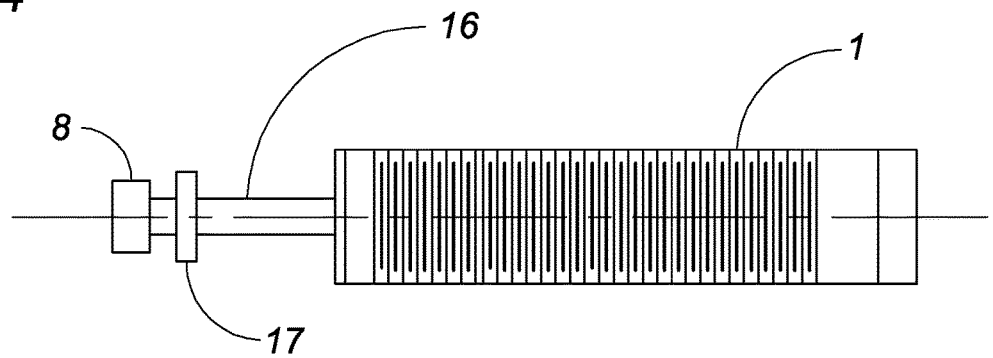
FIG. 5 is an isolated view of the post and piston.
Figure 6:
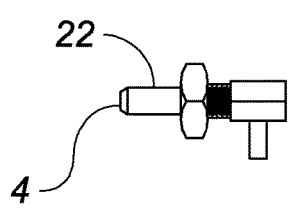
FIG. 6 is an isolated view of the latch member.

An aperture on the first end of the post telescopically receives a piston 16 having a flange 17 on intermediate portion and a cap 8 at a distal end. The piston is movable between a retracted position, where the cap is proximal a first open end 18 of the sleeve as depicted in FIG. 2, and an extended position, where the cap exits the interior chamber to engage the clutch-release arm 5 on a motorcycle, as depicted in FIG. 3. The sleeve includes a pair of apertures 38 that receive adjustment pins 31 to allow a user to manually move the cap 8 toward and away from the clutch-release arm. A hydraulic cylinder 30 within the post interior biases the piston in the extended position. A knob 15 can be rotated to vary the diameter of the fluid passageway to adjust the resistance applied to the clutch-release arm, and therefore, vary the delay in which the motor is engaged.

The hydraulic cylinder thrusts the piston into engagement with the clutch release arm when an L-shaped latch member 4 on the sleeve outer wall, or a cable mechanism is released. The latch member includes a spring-biased linear portion 22 extending into the interior chamber that engages the flange 17 to retain the piston in the retracted position.

Accordingly, to use the device, a rider pulls the latch member 4 to release the biased piston, thereby extending the cap 8 against the clutch-release arm 5. When the rider fully opens the throttle and releases the clutch, the clutch-release arm will pivot against the bias applied by the post, preventing the clutch from suddenly engaging the motor. As the clutch-release arm pushes the piston back into the sleeve, the latch member moves in front of the flange to retain the piston in the retracted position. Therefore, the device only limits the clutch-release speed during an initial start while allowing the clutch to operate normally thereafter. If necessary, a user can move the sleeve toward or away from the clutch-release arm to optimally position the piston to properly engage the clutch-release arm when extended. Moreover, the user can rotate the knob 15 to vary the resistance that will be applied to the clutch-release arm when the clutch is released.

Figure 7:
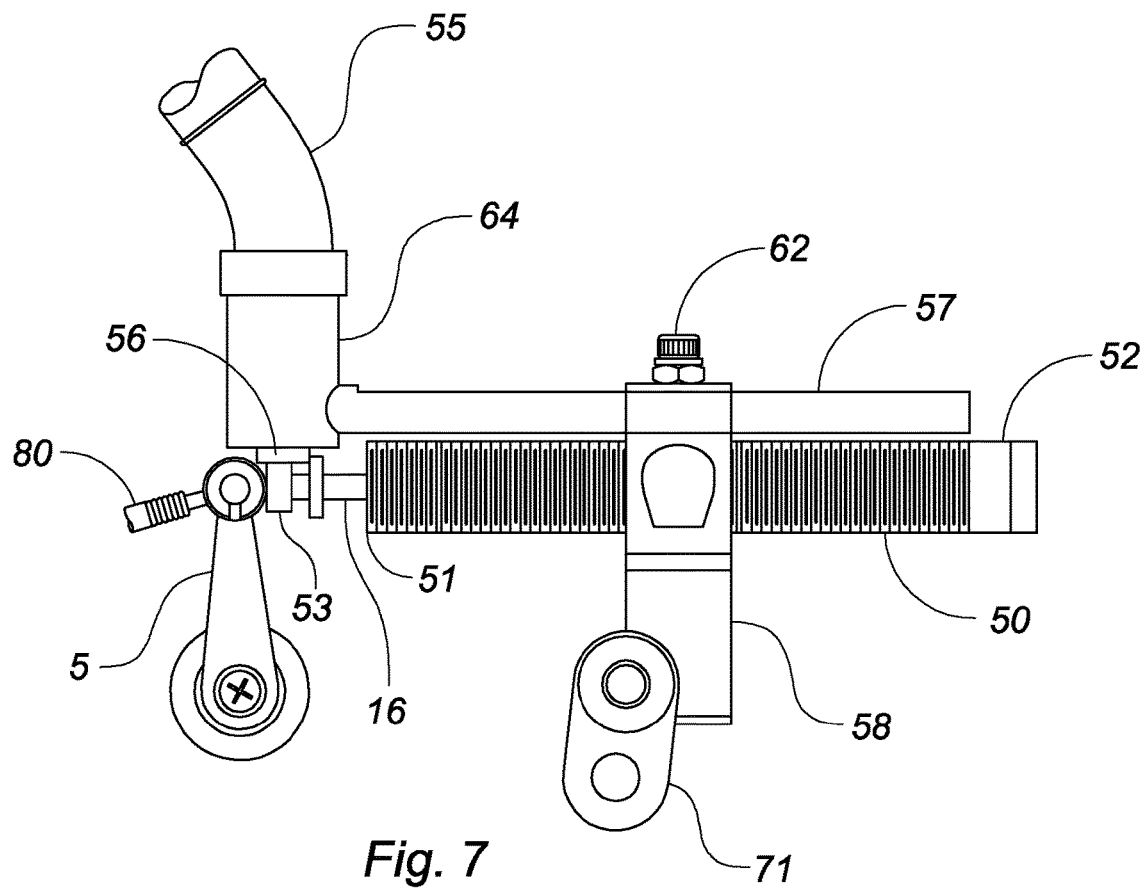
FIG. 7 depicts a second embodiment of the clutch-release control of the present invention, with the piston in a retracted position for normal clutch operation.
Figure 8:
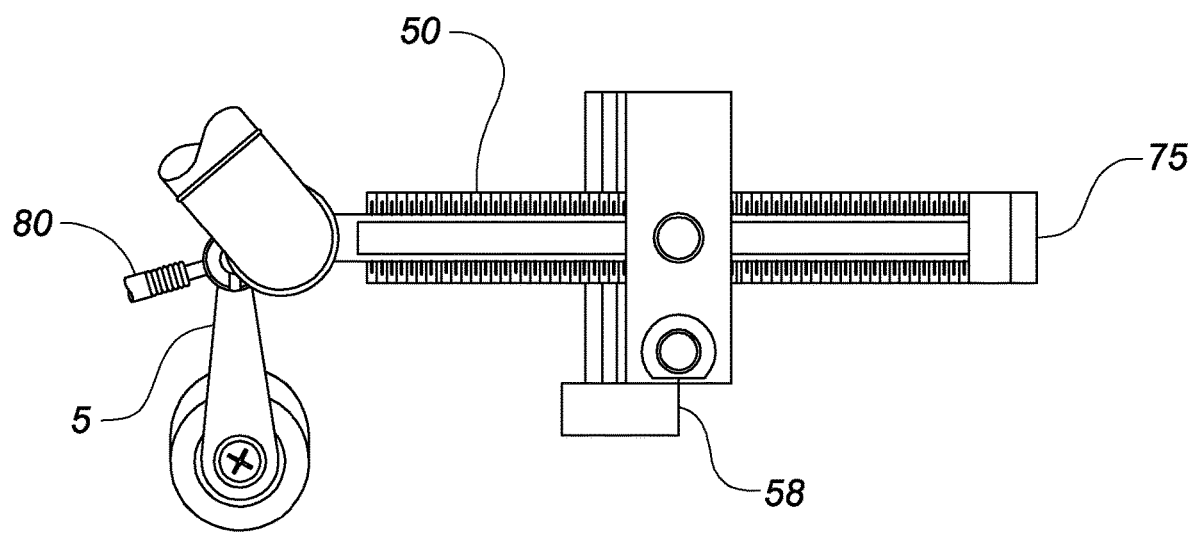
FIG. 8 is a top view of the device depicted in FIG. 7.
Figure 9:
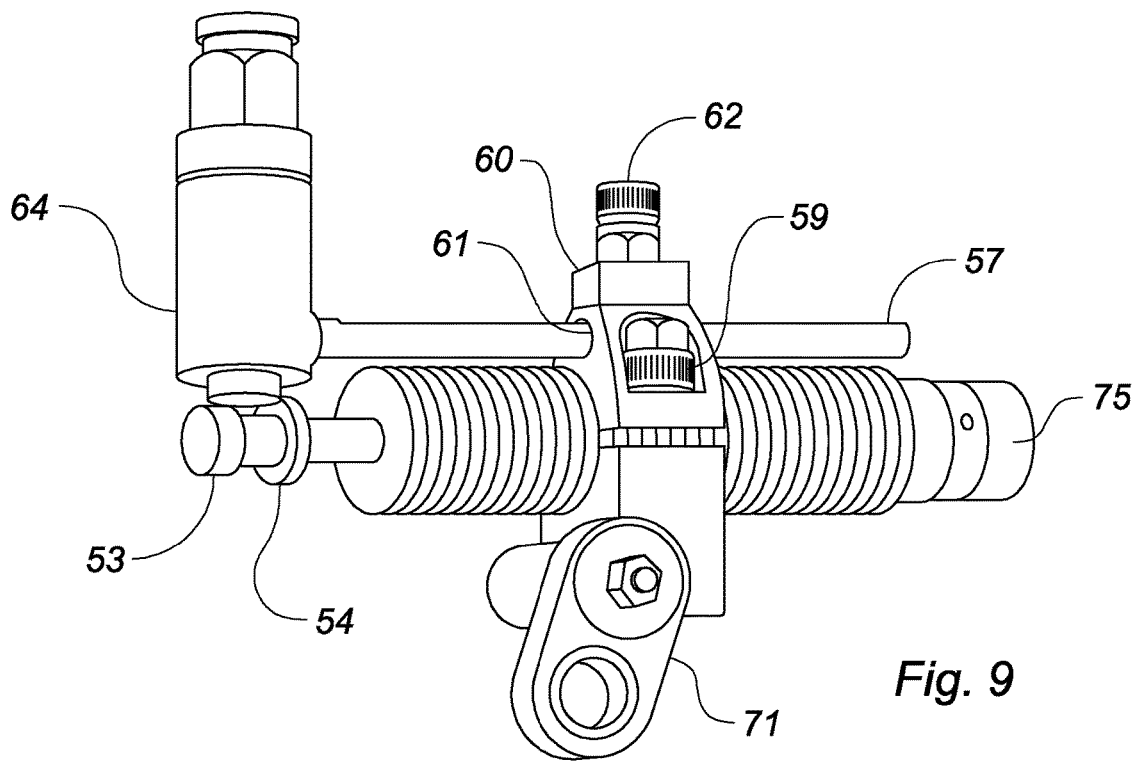
FIG. 9 is a perspective view of the embodiment of FIGS. 7 and 8.
Figure 10:
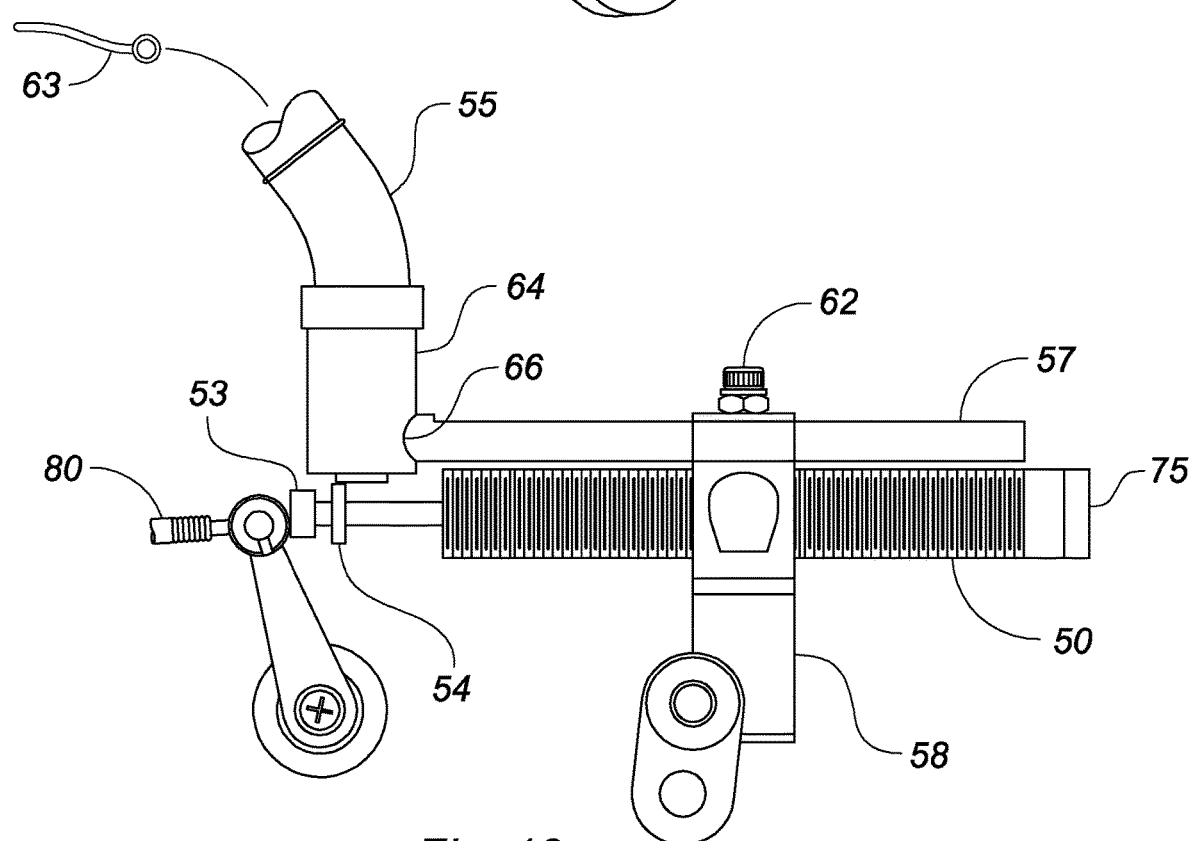
FIG. 10 is a plan view of the embodiment of FIGS. 7-9 with the piston in an extended position, and engaging the clutch-release arm prior to a quick acceleration.

Now referring to FIGS. 7-10, a second embodiment includes a different latching mechanism and adjustment means for varying the distance between the cap and the clutch-release arm 5. The second embodiment includes an elongated, threaded post 50 having a first end 51 and an opposing second end 52. The piston 16 is telescopically received within an aperture on the first end of the post. The piston includes a cap 53 at a distal end and a flange 54 spaced therefrom. The piston is movable between a retracted position, where the cap is proximal a first end of the post as depicted in FIGS. 7-9, and an extended position, where the cap engages the clutch-release arm 5 on a motorcycle, as depicted in FIG. 10.

A lever 63 on the handlebar or a similar convenient location operates a cable 55 having a shroud 64 at a distal end. Received within the shroud is a spring-biased latch member 56 that normally engages the front side of the flange to secure the piston in the retracted position. When the lever is pivoted in a given direction, the cable and latch member are raised to release the piston, allowing it to extend and engage the clutch-release arm. When the rider fully opens the throttle and releases the clutch (via cable 80), the extended piston applies a predetermined amount of resistance to the arm, preventing the clutch from suddenly engaging the motor. As the clutch-release arm pushes the piston back into the post, the latch member moves in front of the flange to retain the piston in the retracted position, allowing normal clutch operation.

The adjustment mechanism includes an elongated tube 57 positioned atop the post and having an end seated within a cavity 66 formed on the shroud. A clamp 58 formed of a pair of mating sections are tightened around the post with fasteners 59. An upper clamp section 60 includes a bore 61 that slidably receives the tube. A set screw 62 releasably fixes the tube at a select position within the bore. By releasing the set screw, a user can slide the post forward or backward to optimally position the piston to assure that it properly engages the clutch-release arm when extended. A bracket 71 secured to the lower section fastens the device to the engine case. As with the first embodiment, a knob 75 can be rotated to vary the diameter of the fluid passageway to adjust the resistance applied to the clutch-release arm, and therefore, vary the delay in which the motor is engaged.

The above-described device is not limited to the exact details of construction and enumeration of parts provided herein. For example, although the device has been primarily depicted and described as being designed for a motorcycle, it can also be used with 4-wheelers, ATVs or any other vehicle used in applications where a quick acceleration causes the problems described herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A clutch-release control for a motorcycle comprising:
  a post received having a first end, a second end and an intermediate portion;
  a movable piston extending from the first end of the post, said piston having a cap at a distal end and a flange spaced therefrom, said piston movable between a retracted position, where the cap is proximal the first end of the post, and an extended position, where the cap engages a clutch-release arm on the motorcycle, said cap biased in the extended position, whereby when a rider fully opens a throttle and releases a clutch, the clutch-release arm pivots against a predetermined amount of resistance applied by the piston thereby limiting a speed of said clutch-release arm;
  means for repositioning the cap relative to said clutch-release arm.

2. The clutch-release control according to claim 1 further comprising a means for biasing the piston in the extended position.

3. The clutch-release control according to claim 2 wherein said means for biasing the piston in the extended position comprises a hydraulic cylinder receiving said piston and received within said post.

4. The clutch-release control according to claim 1 further comprising a means for securing said piston in the retracted position to prevent interference with said clutch-release arm after the sudden acceleration has been achieved.

5. The clutch-release control according to claim 4 wherein said means for securing said piston in the retracted position includes a latch member having a spring-biased linear portion engaging said flange to retain the piston in the retracted position.

6. The clutch-release control according to claim 4 wherein said means for securing said piston in the retracted position comprises:
   a lever;
   a cable operably connected to said lever, said cable having a latch member at a distal end, said latch member engaging said flange to retain the piston in the retracted position.

7. The clutch-release control according to claim 1 wherein said means for repositioning the cap relative to said clutch-release arm comprises:
   a sleeve receiving said piston;
   at least one aperture on said sleeve;
   a releasable fastener within said aperture and engaging said post that allows a user to manually move said post relative to said sleeve.

8. The clutch-release control according to claim 7 further comprising a bracket on the outer wall of said sleeve, said bracket having multiple fasteners to secure the sleeve to the motorcycle, near the clutch-release arm.

9. The clutch-release control according to claim 1 wherein said means for repositioning the cap relative to said clutch-release arm comprises:
   an elongated tube positioned on said post;
   a clamp secured to said post, said clamp having a bore slidably receiving said tube;
   a releasable fastener on said clamp and engaging said tube for fixing said clamp at a select position relative to said tube.

10. The clutch-release control according to claim 9 further comprising a bracket attached to said clamp to secure the clutch-release control to the motorcycle, proximal said clutch-release arm.

11. A clutch-release control for a motorcycle comprising:
    a post received having a first end, a second end and an intermediate portion;
    a movable piston extending from the first end of the post, said piston having a cap at a distal end and a flange spaced therefrom, said piston movable between a retracted position, where the cap is proximal the first end of the post, and an extended position, where the cap engages a clutch-release arm on the motorcycle, said cap biased in the extended position, whereby when a rider fully opens a throttle and releases a clutch, the clutch-release arm pivots against a predetermined amount of resistance applied by the piston thereby limiting a speed of said clutch-release arm;
    a means for securing said piston in the retracted position to prevent interference with said clutch-release arm after the sudden acceleration has been achieved.

12. The clutch-release control according to claim 11 further comprising a means for biasing the piston in the extended position.

13. The clutch-release control according to claim 12 wherein said means for biasing the piston in the extended position comprises a hydraulic cylinder receiving said piston and received within said post.

14. The clutch-release control according to claim 11 wherein said means for securing said piston in the retracted position includes a latch member having a spring-biased linear portion engaging said flange to retain the piston in the retracted position.

15. The clutch-release control according to claim 11 wherein said means for securing said piston in the retracted position comprises:
    a lever;
    a cable operably connected to said lever, said cable having a latch member at a distal end, said latch member engaging said flange to retain the piston in the retracted position.

16. The clutch-release control according to claim 11 further comprising a means for repositioning the cap relative to said clutch-release arm.

17. The clutch-release control according to claim 16 wherein said means for repositioning the cap relative to said clutch-release arm comprises:
    a sleeve receiving said piston;
    at least one aperture on said sleeve; and
    a releasable fastener within said aperture and engaging said post that allows a user to manually move said post relative to said sleeve.

18. The clutch-release control according to claim 17 further comprising a bracket on the outer wall of said sleeve, said bracket having multiple fasteners to secure the sleeve to the motorcycle, near the clutch-release arm.

19. The clutch-release control according to claim 16 wherein said means for repositioning the cap relative to said clutch-release arm comprises:
    an elongated tube positioned on said post;
    a clamp secured to said post, said clamp having a bore slidably receiving said tube;
    a releasable fastener on said clamp and engaging said tube for fixing said clamp at a select position relative to said tube.

20. The clutch-release control according to claim 19 further comprising a bracket attached to said clamp to secure the clutch-release control to the motorcycle, proximal said clutch-release arm.

* * * * *